US012725941B2

(12) United States Patent
Liao et al.

(10) Patent No.: US 12,725,941 B2
(45) Date of Patent: Sep. 1, 2026

(54) SIX-IN-ONE ANTENNA, AND VEHICLE EMPLOYING ANTENNA

(71) Applicants: Futaijing Precision Electronics (Yantai) Co., Ltd., Yantai (CN); HON HAI PRECISION INDUSTRY CO., LTD., New Taipei (TW)

(72) Inventors: Chih-Wei Liao, New Taipei (TW); Hsiang-Neng Wen, New Taipei (TW); Ching-Ling Wu, New Taipei (TW); Yung-Yu Tai, New Taipei (TW); Ping-Hsun Ho, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 71 days.

(21) Appl. No.: 18/749,544

(22) Filed: Jun. 20, 2024

(65) Prior Publication Data

US 2025/0300371 A1 Sep. 25, 2025

(30) Foreign Application Priority Data

Mar. 20, 2024 (CN) ........................ 202410322460.X

(51) Int. Cl.

| | |
|---|---|
| ***H01Q 21/28*** | (2006.01) |
| ***H01Q 5/48*** | (2015.01) |
| ***H01Q 21/00*** | (2006.01) |

(52) U.S. Cl.

CPC ......... *H01Q 21/28* (2013.01); *H01Q 21/0006* (2013.01); *H01Q 5/48* (2015.01)

(58) Field of Classification Search

None

See application file for complete search history.

(56) References Cited

U.S. PATENT DOCUMENTS

| | | | | |
|---|---|---|---|---|
| 2011/0095952 A1* | 4/2011 | Lai | H01Q 9/44 | 343/749 |
| 2015/0002359 A1* | 1/2015 | Dong | H01Q 1/48 | 343/853 |
| 2019/0379139 A1* | 12/2019 | Takizawa | H01Q 1/526 | |
| 2020/0058992 A1* | 2/2020 | Wu | H01Q 21/28 | |

FOREIGN PATENT DOCUMENTS

| | | | |
|---|---|---|---|
| CN | 109980364 A * | 7/2019 | H01Q 5/314 |

* cited by examiner

*Primary Examiner* — Dameon E Levi
*Assistant Examiner* — Anh Ho
(74) *Attorney, Agent, or Firm* — ScienBiziP, P.C.

(57) ABSTRACT

An antenna includes a substrate, a grounding part, and a radiation part. the radiation part comprises a first antenna, a second antenna, a third antenna, a fourth antenna, a fifth antenna, and a sixth antenna. The grounding part is arranged as a shape of "T" and has a longitudinal segment and a transverse segment. The first antenna is located on a right side of the transverse segment. The second antenna is located on an upper side of the transverse segment. The third antenna is located on a right side of the longitudinal segment. The fourth antenna is located on a left side of the longitudinal segment. The fifth antenna is located on a left side of the transverse segment. The sixth antenna is located on an upper sides of the transverse segment. A vehicle is also provided.

18 Claims, 8 Drawing Sheets

SIX-IN-ONE ANTENNA, AND VEHICLE EMPLOYING ANTENNA

TECHNICAL FIELD

The subject matter herein generally relates to antennas.

BACKGROUND

With the advent of the Internet of vehicles, the amount of external data transmission of vehicles is increasing rapidly with the increasing demand of vehicle audio and video entertainment, cloud management, remote connection, etc. The Internet of vehicles will be deeply integrated with mobile communications, information systems, and transportation industries, and 5G communications and WIFI 6E will greatly improve the communication efficiency.

Among related technologies, 4G antennas and WIFI antennas are no longer able to meet the needs of the future vehicle networking environment, which means that antennas used in vehicle networking must cover a wider bandwidth. Therefore, the design of mobile communication antennas requires not only covering WWAN (Wireless Wide Area Network) and LTE (Long Term Evolution) frequency bands, but also increasing the operating frequency bands required by fifth-generation mobile communication technology (5G-NR). The WIFI antennas also need to increase 6 GHZ (6.1~6.8 GHz) and 7 GHZ (7.1~7.25 GHZ) in addition to using the original 2.4 GHz and 5 GHz bands. How to cover these bands and reduce the size of antennas at the same time has become a major problem in antenna design.

BRIEF DESCRIPTION OF THE DRAWINGS

Implementations of the present technology will now be described, by way of example only, with reference to the attached figures.

DETAILED DESCRIPTION

Figure 1:
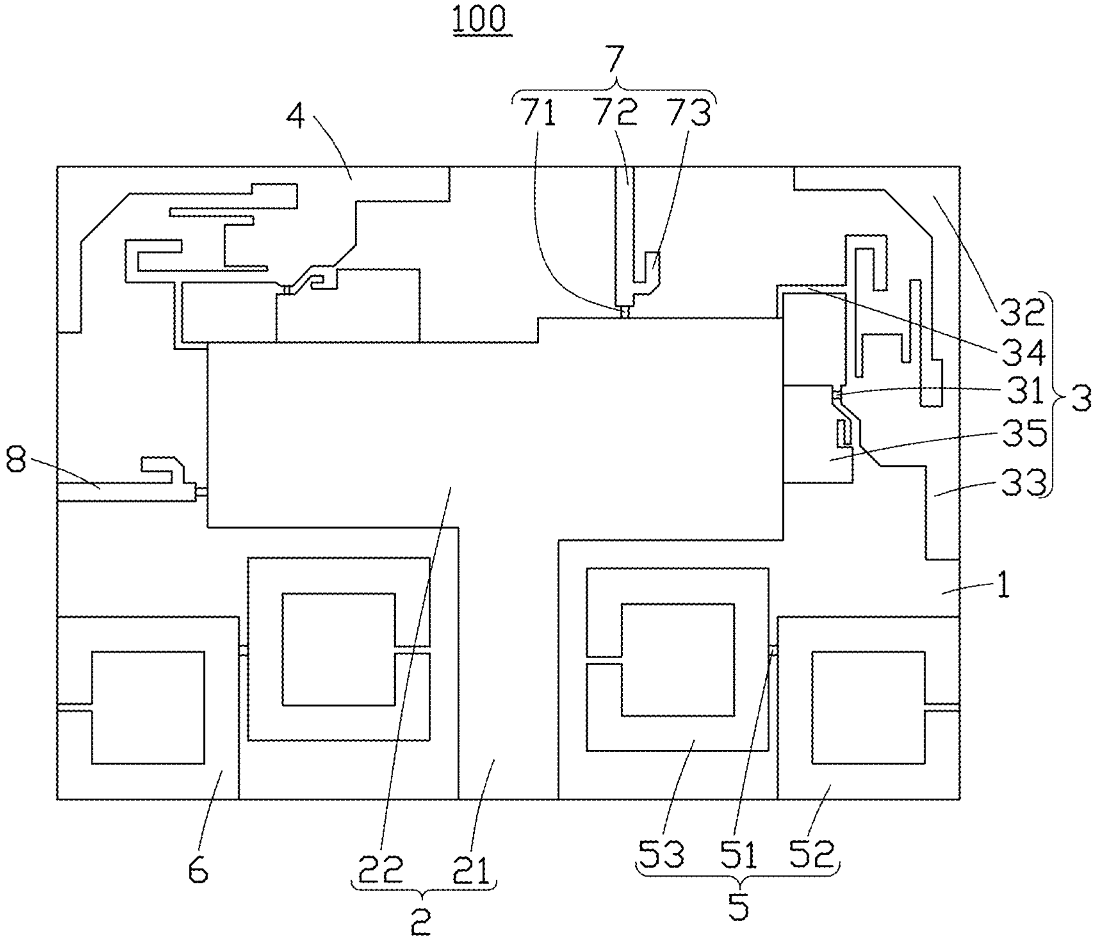
FIG. 1 is a top view of a six-in-one antenna in one embodiment of the present application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, antennas, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the targets are permanently connected or releasably connected. The term "comprising," when utilized, means "including, but not necessarily limited to"; it specifically indicates open-ended inclusion or membership in the so-described combination, group, series, and the like.

Figure 9:
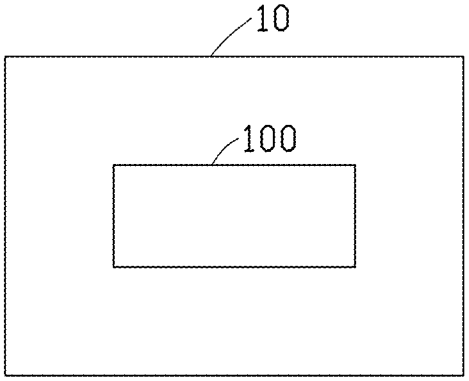
FIG. 9 is a structure diagram of a vehicle in one embodiment of the present application.

FIG. 1 is a top view of a six-in-one antenna 100 in one embodiment of the present application. The six-in-one antenna 100 comprises a substrate 1, a grounding part 2, and a radiation part. The six-in-one antenna 100 can be set in a vehicle 10 shown in FIG. 9, and meets wireless communication needs of the vehicle 10.

In one embodiment, the grounding part 2 is arranged on the substrate 1. The radiation part is arranged on the substrate 1. The radiation part is located on a same side of the substrate 1 with the grounding part 2. The radiation part comprises a first antenna 3, a second antenna 4, a third antenna 5, a fourth antenna 6, a fifth antenna 7, and a sixth antenna 8. The grounding part 2 is arranged as a shape of "T" and has a longitudinal segment 21 and a transverse segment 22. The first antenna 3 is located on a right side of the transverse segment 22. The second antenna 4 is located on an upper side of the transverse segment 22. The third antenna 5 is located on a right side of the longitudinal segment 21. The fourth antenna 6 is located on a left side of the longitudinal segment 21. The fifth antenna 7 is located on the upper side of the transverse segment 22. The sixth antenna 8 is located on a left side of the transverse segment 22.

For example, the first antenna 3 can be a full band antenna, covering 699~960 MHz and 1500~5000 MHz. The second antenna 4 can be a full band antenna, covering 699~960 MHz and 1500~5000 MHz. The third antenna 5 can be a middle and high band antenna, covering 1500~5000 MHz. The fourth antenna 6 can be a middle and high band antenna, covering 699~960 MHz and 1500~5000 MHz. The fifth antenna 7 can be a WIFI antenna, covering 2400~2500 MHz and 5150~7125 MHz. The sixth antenna 8 can be a WIFI antenna, covering 2400~2500 MHz and 5150~7125 MHz.

By integrating six antennas in the six-in-one antenna 100, the space of the product applied the six-in-one antenna 100 can be reduced, thus realizing the miniaturization of the product. By setting the first antenna 3, the second antenna 4, the third antenna 5, the fourth antenna 6, the fifth antenna 7, and the sixth antenna 8, the six-in-one antenna 100 can work in multiple frequency bands, meeting the communication requirements of the mass data transmission.

In one embodiment, the first antenna 3 comprises a first feeding unit 31, a first radiation unit 32, a second radiation unit 33, a grounding unit 34, and a coupling unit 35. The ground unit 34 and the coupling unit 35 are connected with the right side of the transverse segment 22. The coupling unit 35 is connected with the first radiation unit 32 and the second radiation unit 33 through the first feeding unit 31.

In the first antenna 3, the first feeding unit 31 and the first radiation unit 32 can achieve the radiation of low-frequency band of 699~960 MHz, and the second radiation unit 33 can achieve the radiation of 1500~3000 MHz frequency band, and the coupling unit 35 can cooperate with the first antenna 3 to achieve the radiation of 3000~5000 MHz frequency band. The ground unit 34 is connected with the ground part 2 to realize the matching adjustment of the first antenna 3, so that the total length of the ground unit 34 and the ground part 2 can reach the length of the receiving and transmitting device in 699~960 MHz and 1500~5000 MHz.

Figure 2:
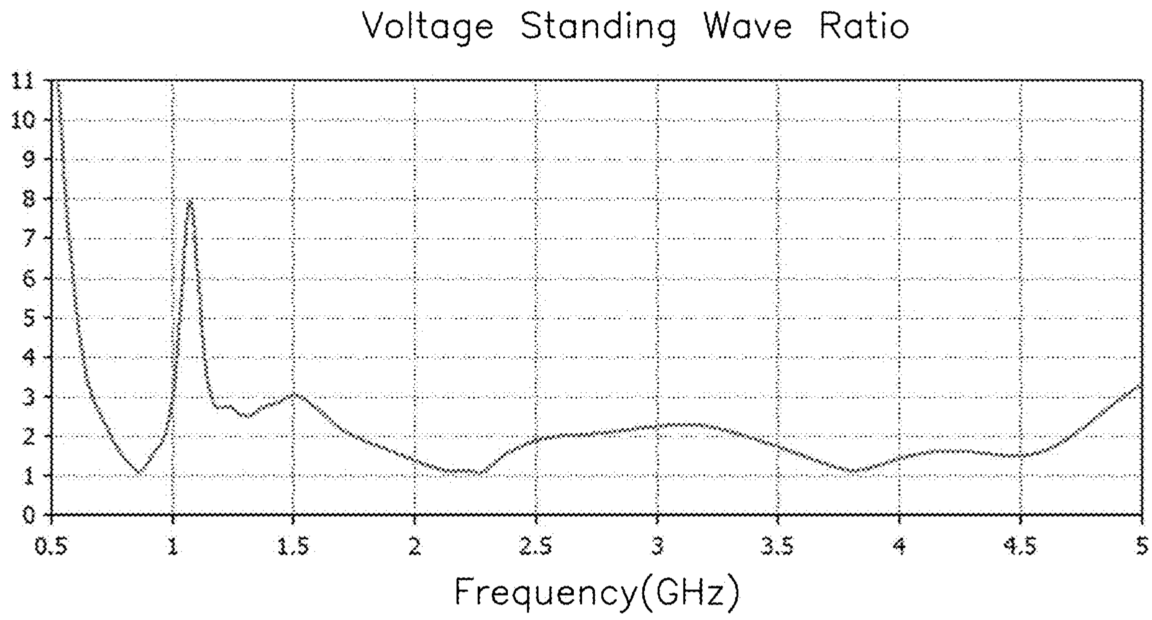
FIG. 2 is a standing-wave diagram of a first antenna in one embodiment of the present application.

FIG. 2 is a standing-wave diagram of the first antenna 3 in one embodiment of the present application. The first antenna 3 has a standing wave ratio of less than 4 in the frequency band of 699~960 MHz and 1500~5000 MHz, which indicates that the reflection loss of the first antenna 3 is small.

Referring to FIG. 1, in one embodiment, the structure of the second antenna 4 is the same as the structure of the first antenna 3, and the ground unit and the coupling unit of the second antenna 4 are connected to the upper side of the transverse segment 22. Through the setting of this structure, the signal shielding performance can be achieved, the isolation between the first antenna 3 and the second antenna 4 can be improved, and the interference between similar signals can be reduced.

Figure 3:
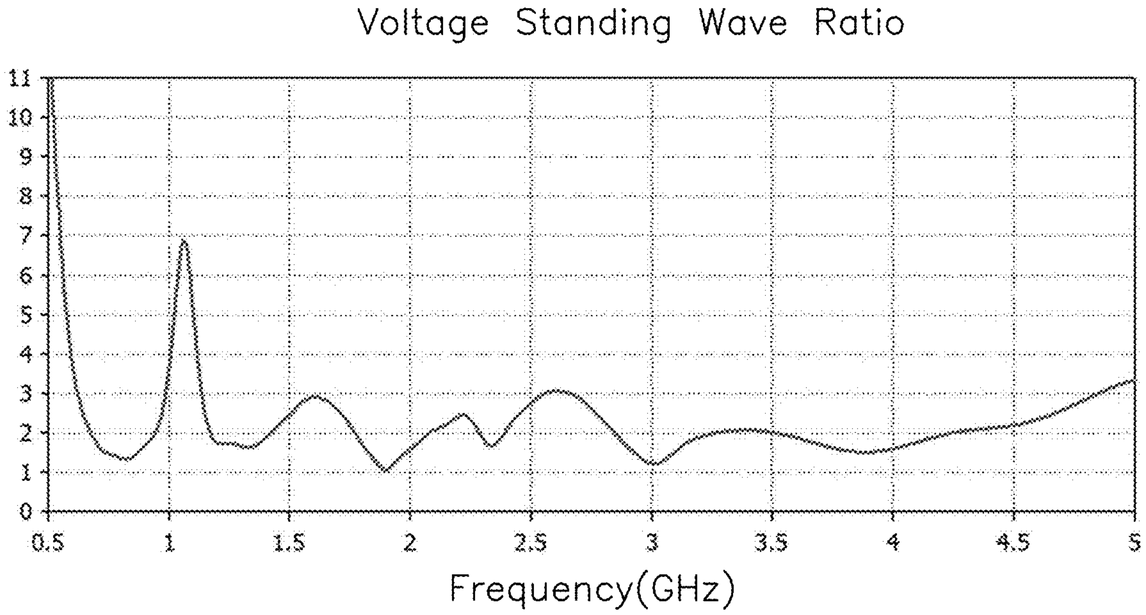
FIG. 3 is a standing-wave diagram of a second antenna in one embodiment of the present application.

FIG. 3 is a standing-wave diagram of the second antenna 4 in one embodiment of the present application. The second antenna 4 has a standing wave ratio of less than 4 in the frequency band of 699~960 MHz and 1500~5000 MHz, which indicates that the reflection loss of the second antenna 4 is small.

In one embodiment, the first antenna 3 and the second antenna 4 are 5G broadband antennas, and the working band of 5G broadband antennas can include 2G bands, 3G bands, 4G bands, 5G bands, and can be 5G NR (New Radio) bands in all countries and regions in the world.

Referring to FIG. 1, in one embodiment, the third antenna 5 is arranged at an interval with the longitudinal segment 21. The third antenna 5 comprises a second feeding unit 51, a third radiating unit 52, and a fourth radiating unit 53. The third radiation unit 52 is connected with the fourth radiation unit 53 through the second feed unit 51. The third radiation unit 52 and the fourth radiation unit 53 can form a dipole antenna to realize the mid-high frequency band wavelength of 1500~5000 MHz.

Figure 4:
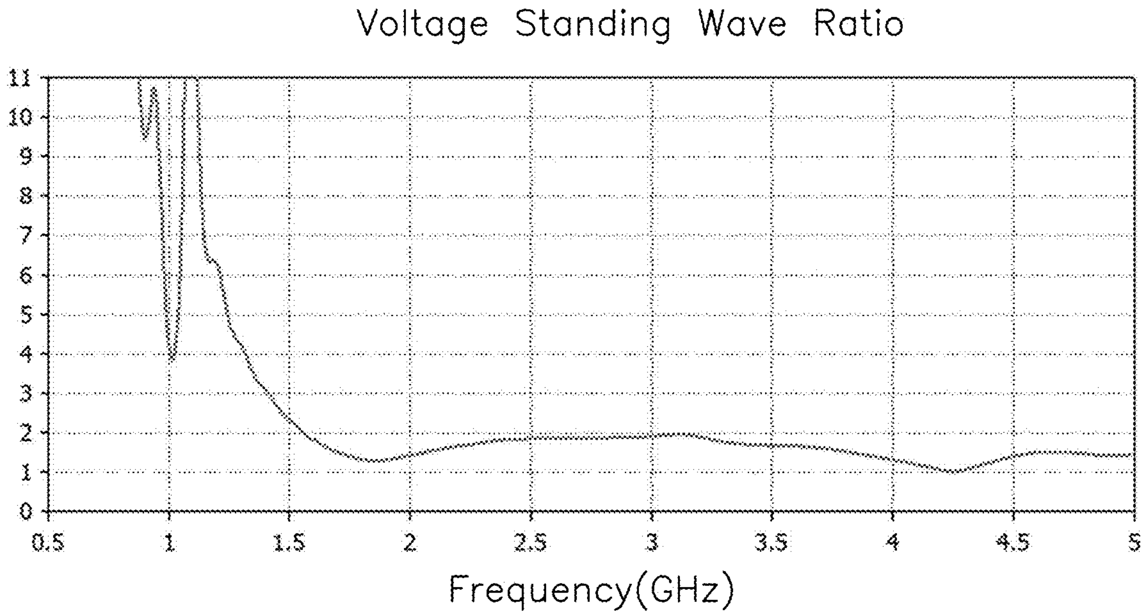
FIG. 4 is a standing-wave diagram of a third antenna in one embodiment of the present application.

FIG. 4 is a standing-wave diagram of the third antenna 5 in one embodiment of the present application. The third antenna 5 has a standing wave ratio of less than 3 in the frequency band of 1500~5000 MHz, which indicates that the reflection loss of the third antenna 5 is small.

In one embodiment, the structure of the fourth antenna 6 is the same as the structure of the third antenna 5, and the fourth antenna 6 is symmetrically arranged with the third antenna 5 about the longitudinal segment. Through the setting of this structure, the signal shielding performance can be achieved, the isolation between the third antenna 5 and the fourth antenna 6 can be improved, and the interference between similar signals can be reduced.

Figure 5:
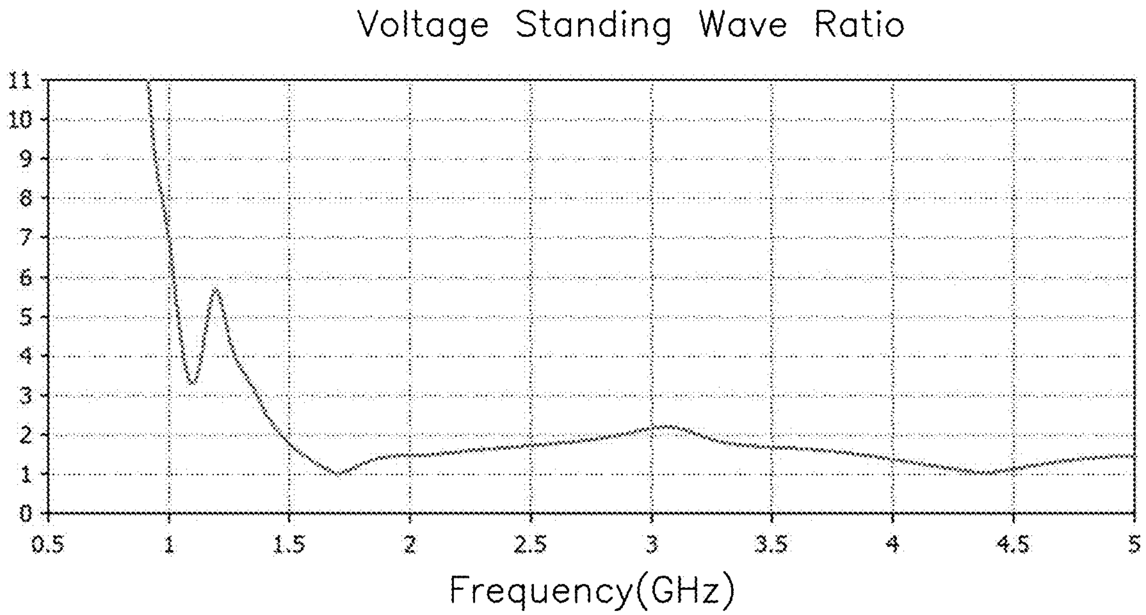
FIG. 5 is a standing-wave diagram of a fourth antenna in one embodiment of the present application.

FIG. 5 is a standing-wave diagram of the fourth antenna 6 in one embodiment of the present application. The third antenna 5 has a standing wave ratio of less than 3 in the frequency band of 1500~5000 MHz, which indicates that the reflection loss of the fourth antenna 6 is small.

In one embodiment, the third antenna 5 and the fourth antenna 6 are both 5G MIMO (Multiple Input Multiple Output) antennas.

Referring to FIG. 1, in one embodiment, the fifth antenna 7 comprises a third feeding unit 71, a fifth radiating unit 72, and a sixth radiating unit 73. The third feed unit 71 is connected with the upper side of transverse segment 22. In the fifth antenna 7, the third unit 71 and the fifth radiation unit 72 can achieve the radiation of 2400~2500 MHz frequency band, and the sixth radiation unit 73 can achieve the radiation of 5150~7125 MHz frequency band.

Figure 6:
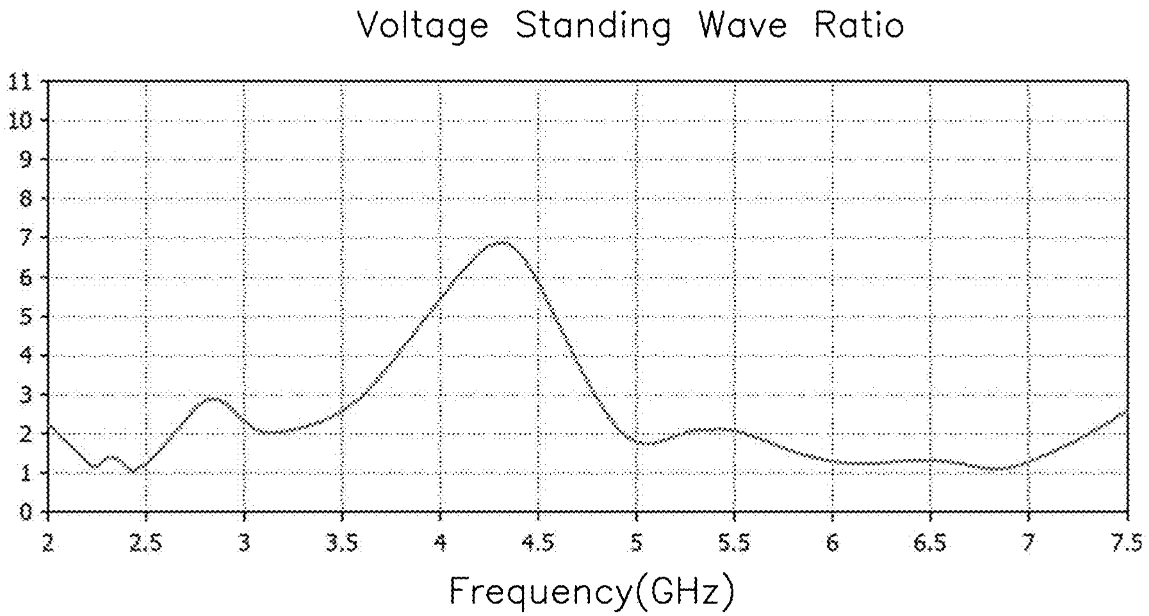
FIG. 6 is a standing-wave diagram of a fifth antenna in one embodiment of the present application.

FIG. 6 is a standing-wave diagram of the fifth antenna 7 in one embodiment of the present application. The fifth antenna 7 has a standing wave ratio of less than 3 in the frequency band of 2400~2500 MHz and 5150~7125 MHz, which indicates that the reflection loss of the fifth antenna 7 is small.

In one embodiment, the structure of the sixth antenna 8 is the same as the structure of the fifth antenna 7, and the feed unit of the sixth antenna 8 is connected with the left side of the transverse segment 22. Through the setting of this structure, the signal shielding performance can be achieved, the isolation between the fifth antenna 7 and the sixth antenna 8 can be improved, and the interference between similar signals can be reduced.

Figure 7:
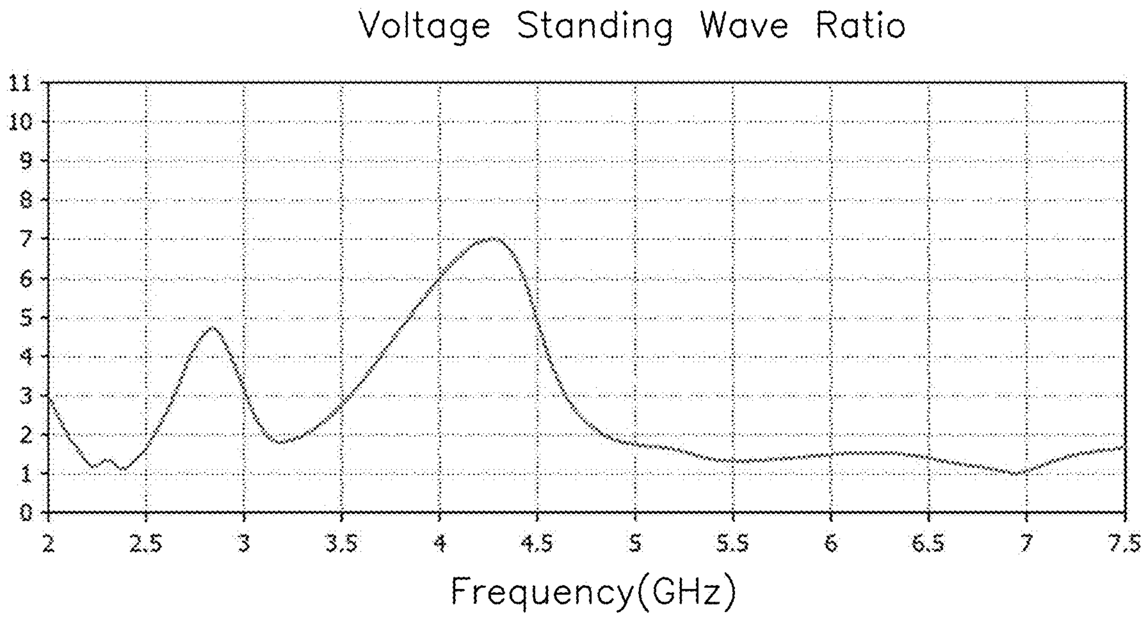
FIG. 7 is a standing-wave diagram of a sixth antenna in one embodiment of the present application.

FIG. 7 is a standing-wave diagram of the sixth antenna 8 in one embodiment of the present application. The sixth antenna 8 has a standing wave ratio of less than 3 in the frequency band of 2400~2500 MHz and 5150~7125 MHz, which indicates that the reflection loss of the sixth antenna 8 is small.

In one embodiment, the operating bands of the fifth antenna 7 and the sixth antenna 8 can include Wi-Fi 6E and V2X (vehicle to everything) bands.

Figure 8:
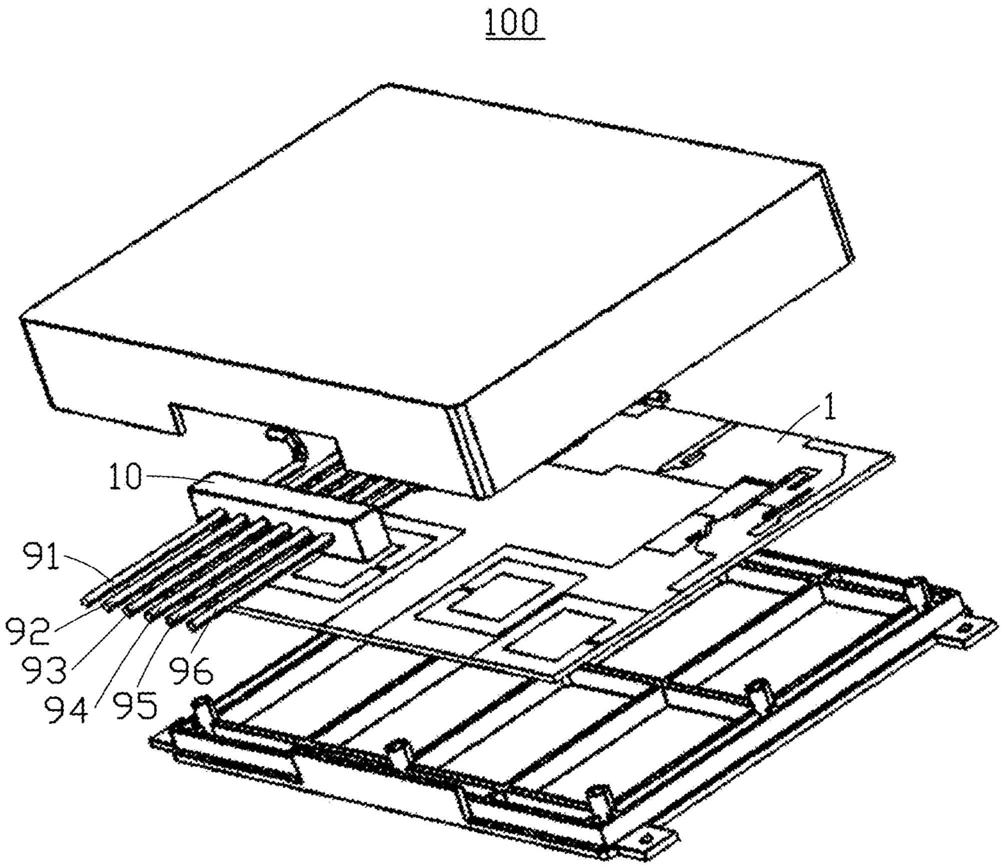
FIG. 8 is a structure diagram of a six-in-one antenna in one embodiment of the present application.

FIG. 8 is a structure diagram of the six-in-one antenna 100 in one embodiment of the present application. The six-in-one antenna 100 further comprises a first transmission line 91, a second transmission line 92, a third transmission line 93, a fourth transmission line 94, a fifth transmission line 95, and a sixth transmission line 96. The first transmission line 91 is connected with the first antenna 3. The second transmission line 92 is connected with the second antenna 4. The third transmission line 93 is connected with the third antenna 5. The fourth transmission line 94 is connected with the fourth antenna 6. The fifth transmission line 95 is connected with the fifth antenna 7. The sixth transmission line 96 is connected with the sixth antenna 8.

In one embodiment, the six-in-one antenna 100 further includes a rubber ring 10. The rubber ring 10, a radiation part 9, and a grounding part 2 are located on the same side of substrate 1. The rubber ring 10 can facilitate the worker to attach the transmission lines to the substrate 1.

In one embodiment, the rubber ring 10 is located at the front of substrate 1, and the six transmission lines extend to the rear of substrate 1. The rubber ring 10 can be set to guide the installation of the six transmission lines, thus avoiding mutual interferences of the six transmission lines, improving the efficiency of the installation.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A six-in-one antenna, comprising:

a substrate;

a grounding part arranged on the substrate; and a radiation part arranged on the substrate, wherein the radiation part is located on the same side of the substrate having the grounding part, the radiation part comprises a first antenna, a second antenna, a third antenna, a fourth antenna, a fifth antenna, and a sixth antenna;

the grounding part is arranged as a shape of "T" and comprises a longitudinal segment and a transverse segment, the first antenna is located on a right side of the transverse segment, the second antenna is located on an upper side of the transverse segment, the third antenna is located on a right side of the longitudinal segment, the fourth antenna is located on a left side of the longitudinal segment, the fifth antenna is located on the upper side of the transverse segment, the sixth antenna is located on a left side of the transverse segment;

wherein the first antenna comprises a first feeding unit, a first radiation unit, a second radiation unit, a grounding unit, and a coupling unit, the grounding unit and the coupling unit are connected with the right side of the transverse segment, the coupling unit is connected with the first radiation unit and the second radiation unit through the first feeding unit.

2. The six-in-one antenna of claim 1, wherein a structure of the second antenna is the same as a structure of the first antenna, a ground unit and a coupling unit of the second antenna are connected with the upper side of the transverse segment.

3. The six-in-one antenna of claim 1, wherein the third antenna is arranged at an interval with the longitudinal segment, and the third antenna comprises a second feeding unit, a third radiation unit and a fourth radiation unit, the third radiation unit is connected with the fourth radiation unit through the second feeding unit.

4. The six-in-one antenna of claim 3, wherein a structure of the fourth antenna is the same as a structure of the third antenna, the fourth antenna is symmetrically arranged with the third antenna about the longitudinal segment.

5. The six-in-one antenna of claim 3, wherein the fifth antenna comprises a third feeding unit, a fifth radiation unit and a sixth radiation unit, the third feeding unit is connected with the upper side of the transverse segment.

6. The six-in-one antenna of claim 5, wherein a structure of the sixth antenna is the same as a structure of the fifth antenna, a feeding unit of the sixth antenna is connected with the left side of the transverse segment.

7. The six-in-one antenna of claim 1, further comprising a first transmission line, a second transmission line, a third transmission line, a fourth transmission line, a fifth transmission line, a sixth transmission line, and a rubber ring, wherein the rubber ring is configured to guide an installation of the six transmission lines on the substrate.

8. The six-in-one antenna of claim 7, wherein the rubber ring and the radiation part are located on the same side of the substrate.

9. The six-in-one antenna of claim 8, wherein the rubber ring is located at a front end of the substrate, the six transmission lines extend to a rear side of the substrate.

10. A vehicle, comprising a six-in-one antenna, wherein the six-in-one antenna comprise:

a substrate;

a grounding part arranged on the substrate;

a radiation part arranged on the substrate, the radiation part is located on the same side of the substrate with the grounding part, the radiation part comprises a first antenna, a second antenna, a third antenna, a fourth antenna, a fifth antenna, and a sixth antenna;

the grounding part is arranged as a shape of "T" and comprises a longitudinal segment and a transverse segment, the first antenna is located on a right side of the transverse segment, the second antenna is located on an upper side of the transverse segment, the third antenna is located on a right side of the longitudinal segment, the fourth antenna is located on a left side of the longitudinal segment, the fifth antenna is located on the upper side of the transverse segment, the sixth antenna is located on a left side of the transverse segment;

wherein the first antenna comprises a first feeding unit, a first radiation unit, a second radiation unit, a grounding unit, and a coupling unit, the grounding unit and the coupling unit are connected with the right side of the transverse segment, the coupling unit is connected with the first radiation unit and the second radiation unit through the first feeding unit.

11. The vehicle of claim 10, wherein a structure of the second antenna is the same as a structure of the first antenna, a ground unit and a coupling unit of the second antenna are connected with the upper side of the transverse segment.

12. The vehicle of claim 10, wherein the third antenna is arranged at an interval with the longitudinal segment, and the third antenna comprises a second feeding unit, a third radiation unit and a fourth radiation unit, the third radiation unit is connected with the fourth radiation unit through the second feeding unit.

13. The vehicle of claim 12, wherein a structure of the fourth antenna is the same as a structure of the third antenna, the fourth antenna is symmetrically arranged with the third antenna about the longitudinal segment.

14. The vehicle of claim 12, wherein the fifth antenna comprises a third feeding unit, a fifth radiation unit and a sixth radiation unit, the third feeding unit is connected with the upper side of the transverse segment.

15. The vehicle of claim 14, wherein a structure of the sixth antenna is the same as a structure of the fifth antenna, a feeding unit of the sixth antenna is connected with the left side of the transverse segment.

16. The vehicle of claim 10, wherein the six-in-one antenna further comprises a first transmission line, a second transmission line, a third transmission line, a fourth transmission line, a fifth transmission line, a sixth transmission line, and a rubber ring, the rubber ring is configured to guide an installation of the six transmission lines on the substrate.

17. The vehicle of claim 16, wherein the rubber ring and the radiation part are located on a same side of the substrate.

18. The vehicle of claim 17, wherein the rubber ring is located at a front end of the substrate, the six transmission lines extend to a rear side of the substrate.

* * * * *